United States Patent [19]
Bito

[11] Patent Number: 4,684,791
[45] Date of Patent: Aug. 4, 1987

[54] CARD IDENTIFICATION SYSTEM

[75] Inventor: Hiroyasu Bito, Tokyo, Japan

[73] Assignee: Casio Computer Co., Ltd., Tokyo, Japan

[21] Appl. No.: 782,518

[22] Filed: Oct. 1, 1985

[30] Foreign Application Priority Data

Oct. 12, 1984 [JP] Japan ................... 59-213571

[51] Int. Cl.⁴ .............................. G06K 5/00
[52] U.S. Cl. .................... 235/380; 235/382; 235/492
[58] Field of Search .................. 235/449, 382, 492

[56] References Cited

U.S. PATENT DOCUMENTS

| | | | |
|---|---|---|---|
| 3,818,190 | 6/1974 | Silverman | 235/382 |
| 4,094,462 | 6/1978 | Moschner | 235/449 |
| 4,423,415 | 12/1978 | Goldman | 235/382 |
| 4,463,971 | 8/1984 | Hoppe et al. | 235/492 |
| 4,550,248 | 10/1985 | Hoppe et al. | 235/492 |
| 4,588,991 | 5/1986 | Atalla | 235/382 |

Primary Examiner—Harold I. Pitts
Attorney, Agent, or Firm—Frishauf, Holtz, Goodman & Woodward

[57] ABSTRACT

A card identification system comprises an IC card, a terminal and an identification device. The IC card has a magnetic recording stripe for recording first identification data and an IC chip for storing second identification data. The IC card is inserted into the terminal wherein the first and second identification data read out from the IC card are compared respectively with predetermined identification data registered in the terminal for identifying the IC card and the terminal.

25 Claims, 9 Drawing Figures

CARD IDENTIFICATION SYSTEM

BACKGROUND OF THE INVENTION

The present invention relates to a card identification system using an IC card having a magnetic stripe and/or an IC chip.

Credit or cash cards in general use have a magnetic stripe storing identification data of a card holder. The identification data recorded in the magnetic stripe is read out by a magnetic head provided in a terminal device set at a point of sales (POS) such as a store. The data is compared with identification data inputted by the card holder using a keyboard. If a coincidence is found, it is judged that the card is being correctly used, and sales or transactions of goods may be made.

However, since the identification data recorded on the magnetic stripe can be read with relative ease, this may allow illegal use of the card by theft. For this reason, in order to enhance secrecy of the identification data, IC cards incorporating an IC chip are now being used. However, many conventional magnetic cards are still in used.

In these conditions, a credit organization must prepare different types of card identification terminals suitable for various types of card, resulting in increased cost and heavier workload for sales clerks. Since a user mostly holds different types of cards, accidents such as theft, loss and the like are apt to occur.

SUMMARY OF THE INVENTION

It is an object of the present invention to provide a card identification system which can easily and reliably perform identification of an identification card having a magnetic recording medium and/or an IC memory.

According to the present invention, there is provided a card identification system comprising:

an identification card having first and second memory means storing first and second identification data, respectively;

an identification terminal having first read means for reading out the first identification data stored in the first memory means, second read means for reading out the second identification data stored in the second memory means, data selection means for sequentially selecting the first and second identification data read out by the first and second read means, and third memory means for storing at least one of the first and second identification data selected by the data selection means; and identification means for identifying the identification data stored in the third memory means with predetermined identification data.

DETAILED DESCRIPTION OF THE PREFERRED EMBODIMENT

Figure 1:
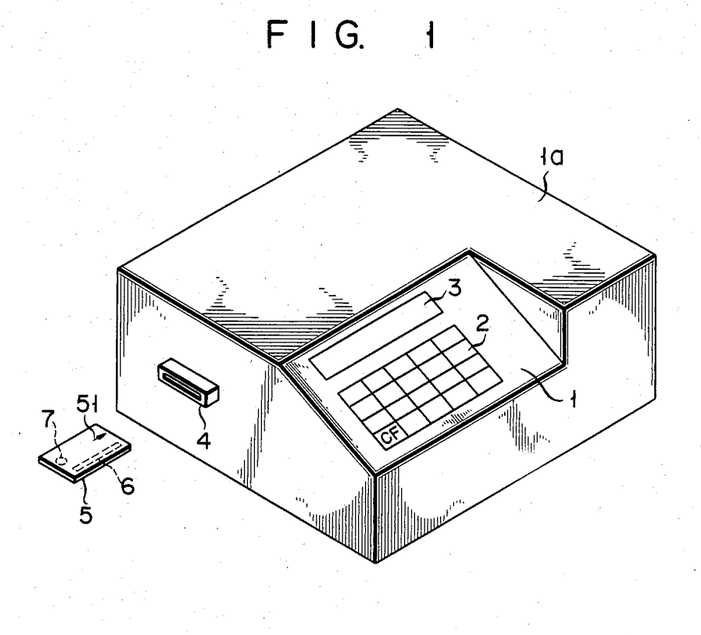
FIG. 1 is a perspective view of an identification terminal and an IC card.
Figure 4:
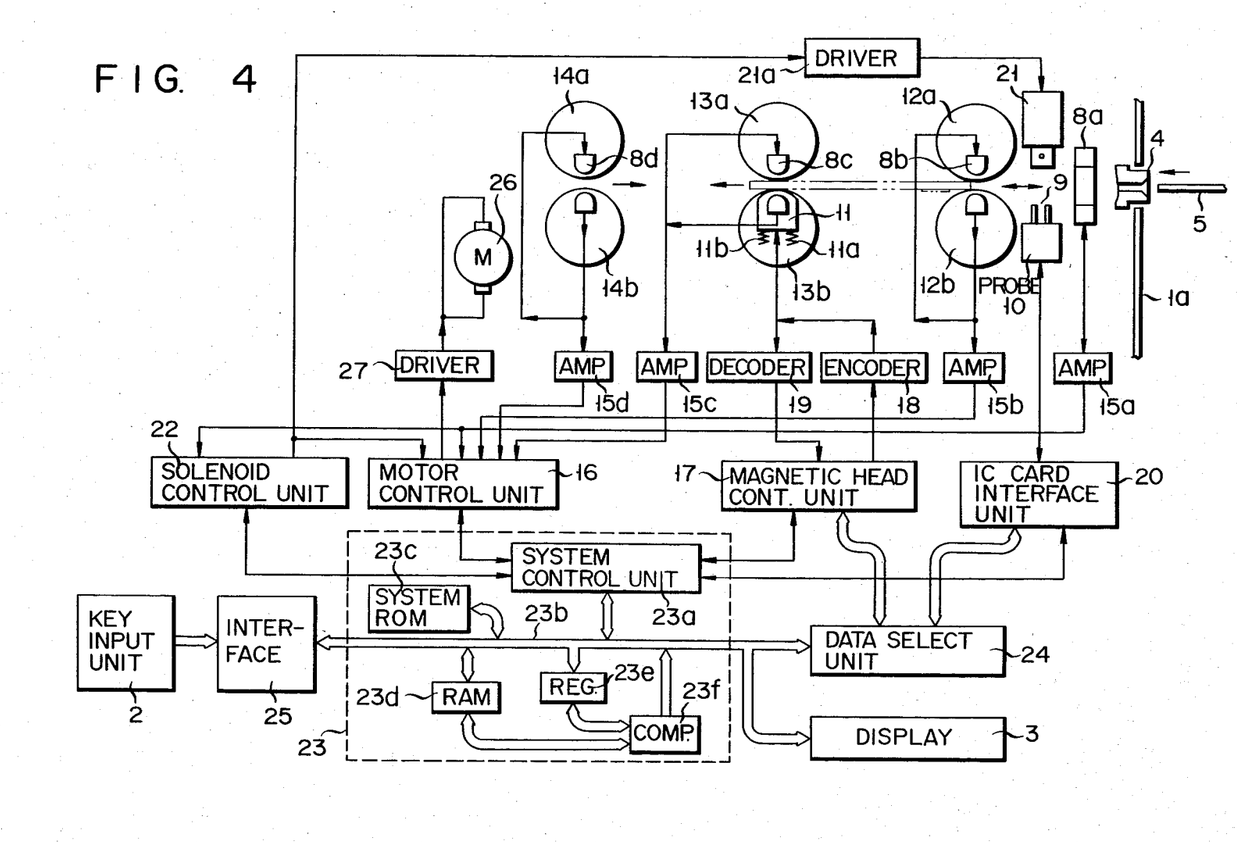
FIG. 4 is a block diagram of a circuit in the terminal.
Figure 5:
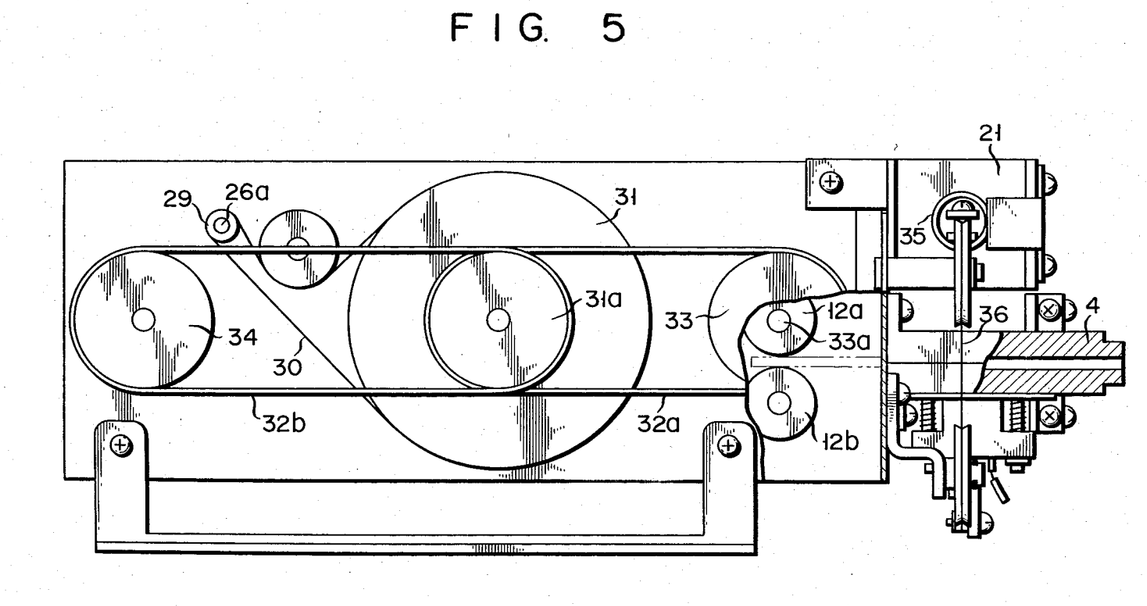
FIG. 5 is a side view showing an internal mechanism of the terminal shown in FIG. 1.
Figure 6:
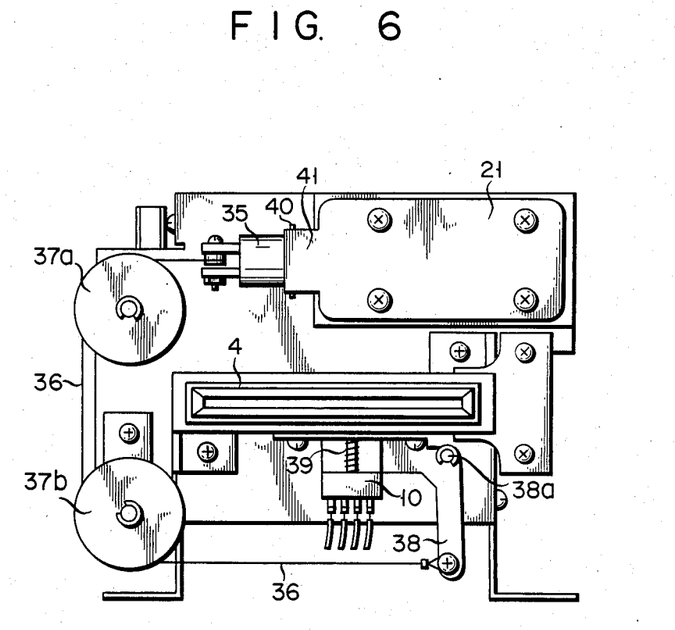
FIG. 6 is a side view of the terminal shown in FIG. 1 viewed from a card insertion port side.

An embodiment of the present invention will be described with reference to the accompanying drawings. Referring to FIG. 1, a terminal 1 as a card identification apparatus is arranged in a store. The terminal 1 has a housing 1a in which a key input unit 2 for inputting sales data, identification data and the like, a data display unit 3, and a card insertion port 4 are formed. An electrical circuit and a mechanism portion shown in FIGS. 4, 5 and 6 are provided in the housing 1a. The port 4 communicates with a card transfer mechanism in the housing 1a, and an IC card 5 inserted in the port 4 is operated in a predetermined manner. The unit 2 has numeric keys for inputting transaction data such as a sales amount and a CF key for instructing an identification operation.

Figure 2:
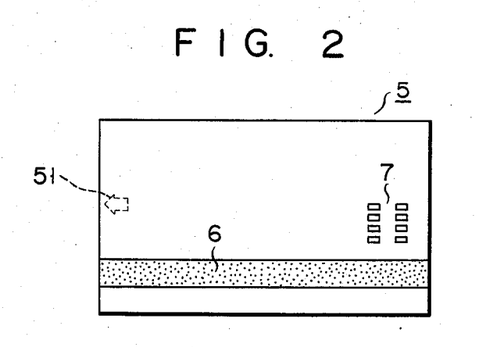
FIG. 2 is a plan view of the IC card.

As shown in FIG. 2, the IC card 5 is formed by laminating a plurality of plastic films, and has a magnetic stripe 6 and a data I/O terminal unit 7 on a surface thereof. An arrow 51 indicates an insertion direction of the card into the port 4. The card 5 incorporates an IC chip having a predetermined function (to be described later), which performs data communication between the terminal 1 and the card 5 through the unit 7 in the terminal 1.

An embossed portion representing the name of a holder, a personal account number and the like is formed on the other surface of the card 5. Note that a position of the arrow 51 and an arrangement of the unit 7 can be determined in accordance with the ISO standards. The unit 7 has eight terminals arranged in a 2 column×4 row matrix. The eight terminals include, for example, an address data I/O terminal, a clock terminal, a reset terminal, a power source terminal, a ground terminal, and a power source terminal for writing data in an EP-ROM, and are gold-plated copper foil.

Figure 3:
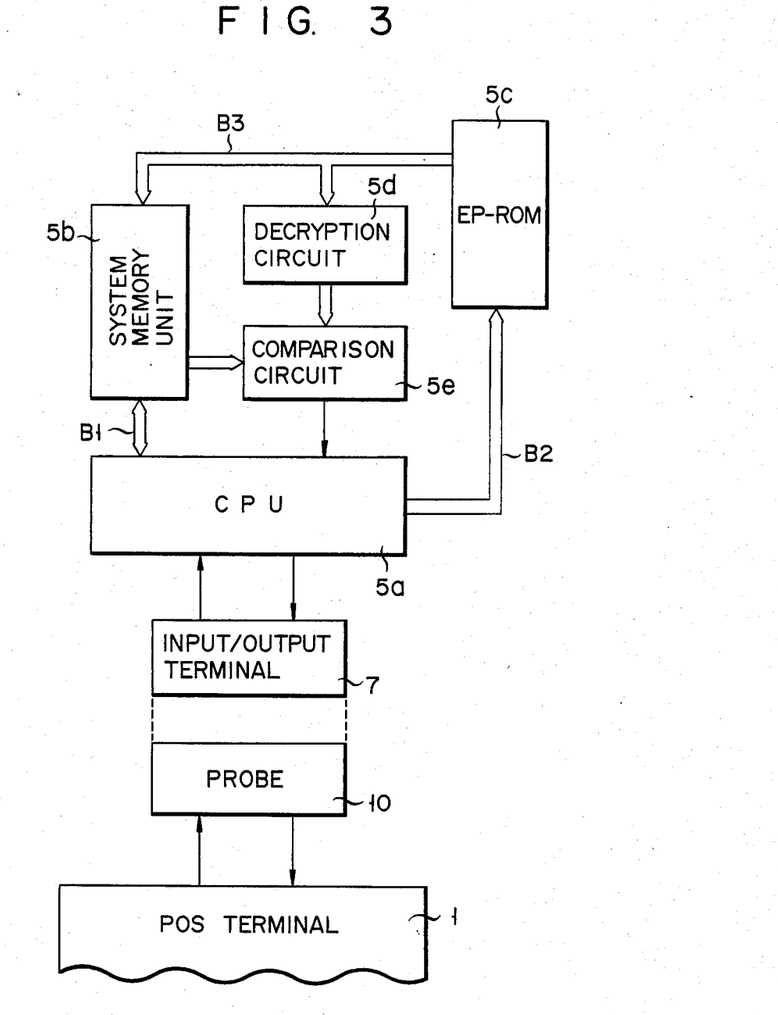
FIG. 3 is a block diagram showing an internal circuit of the IC card.

A circuit configuration in the IC chip of the IC card 5 will be described with reference to FIG. 3. Referring to FIG. 3, the respective terminals of the unit 7 are connected to a CPU 5a. The CPU 5a is connected to a system memory unit 5b and an EP-ROM 5c through bus lines B1 and B2. The EP-ROM 5c stores data associated with a holder, i.e., an identification code, a personal account number, and the name of a holder which are stored in an encrypted form. The unit 7 is connected to a probe 10 provided in the terminal 1. Data outputted from the terminal 1 is supplied to the CPU 5a through the unit 7, and is stored in the unit 5b under the control of the CPU 5a. An address of the encrypted data stored in the EP-ROM 5c is accessed by a CF instruction signal inputted upon CF key operation from the unit 2 of the terminal 1, and is read out to be supplied to a decryption circuit 5d. The identification data decrypted by the circuit 5d is temporarily stored in a buffer circuit provided in the circuit 5d. The identification data is supplied to a comparator 5e together with the identification data sent from the terminal 1 in synchronism with a clock signal so as to be compared with each other. The comparison result data indicating if the data coincide with each other is supplied to a data controller (to be described later) of the terminal 1 through the CPU 5a, the unit 7 and the probe 10.

An internal arrangement of the terminal 1 will be described with reference to FIG. 4. A transfer device of the card 5 will first be described. The card 5 is inserted into the port 4 formed in the housing 1a. In the housing 1a, a card position sensor 8a, the probe 10 having contacts 9 each contacting the eight contacts of the unit 7 of the card 5, card position sensors 8b, 8c and 8d, and a magnetic head 11 arranged to oppose the sensor 8c are provided along a card convey path. Pairs of card driving rollers and driven rollers 12a, 12b, 13a, 13b, 14a and 14b are sequentially provided adjacent to the sensors 8b, 8c and 8d. The driving rollers 12a, 13a and 14a are driven by a motor 26 so as to transfer the card 5 to the left or right of FIG. 4 together with the driven rollers 12b, 13b and 14b. A distance between the port 4 and the roller 12a and distances between the rollers 12a, 13a and 14a are set to be slightly shorter than a length of the card 5 so as to reliably transfer the card 5. Each of the sensors 8a to 8d is constituted by a photointerruptor comprising a combination of a lamp and a photoelectric cell. Detection signals from the sensors 8a to 8d are amplified by amplifiers 15a to 15d, and are supplied to a motor control unit 16.

The magnetic head 11 is mounted so as to be urged against the card 5 by coil springs 11a and 11b, and is brought into contact with the magnetic stripe 6 on the card 5. The identification data to be recorded on the stripe 6 is supplied to the head 11 from a magnetic head control unit 17 through an encoder 18. The data from the head 11 is supplied to the unit 17 through a decoder 19.

The probe 10 is connected to a IC card interface unit 20. The probe 10 is mechanically coupled to a solenoid 21 of a contact up/down mechanism. The solenoid 21 is driven by a driver 21a connected to a solenoid control unit 22 so as to contact/separate the unit 7 of IC card 5 to/from the contact 9.

The units 16, 17, 20 and 22 are connected to a system control unit 23a in a control unit 23 to be controlled thereby. The unit 23a comprises a CPU, and is connected to a system ROM 23c, a RAM 23d, a register 23e and a comparator 23f as other units in the unit 23 through a system bus 23b. The unit 23a is connected to a data select unit 24 through the system bus 23b, and receives magnetic data from the unit 17 or IC data from the unit 20 which is selected by the unit 24. The bus 23b is connected to the display unit 3, and data is displayed under the control of the unit 23. The bus 23b is also coupled to the unit 2 through an interface 25. The motor 26 for driving the rollers 8b to 8d is energized in normal/reverse directions by a motor driver 27 which is controlled by the unit 23a through the unit 16.

A transfer mechanism of the card 5 and an up/down mechanism of the contact 9 will be described with reference to FIGS. 5 and 6. Referring to FIG. 5, a pulley 29 is arranged on a motor shaft 26a of the motor 26, and a belt 30 is engaged with the pulley 29. The belt 30 is engaged with another pulley 31. A pulley 31a having a diameter smaller than the pulley 31 is provided coaxially with the pulley 31. A first rubber belt 32a is engaged with a first belt groove of the pulley 31a, and a second rubber belt 32b is engaged with a second belt groove of the pulley 31a. The belts 32a and 32b are rotated in the same direction as the shaft 26a by engaging pulleys 31, 33 and 34. The driving roller 12a is provided on a shaft 33a of the pulley 33. Similarly, the rollers 13a and 14a of FIG. 4 are coaxially provided on the pulleys 31 and 34. When the shaft 26a is rotated clockwise, the rollers 12a, 13a and 14a are rotated clockwise, and the card 5 is transferred to the left of FIG. 5. When the shaft 26a is rotated counterclockwise, the card 5 is transferred to the right of FIG. 5, and finally, is released from the port 4.

FIG. 6 shows the up/down mechanism of the probe 10. Referring to FIG. 6, the solenoid 21 has a plunger 35 which is coupled to an end of a wire 36. The wire 36 is engaged with pulleys 37a and 37b, and the other end thereof is coupled to an end of an L-shaped lever 38. Therefore, when the plunger 35 is pulled, the lever 38 is pivoted clockwise about a pivot shaft 38a so as to compress a spring 39, and the probe 10 disposed on the other end of the lever 38 is moved upward in FIG. 6. Then, the contact 9 is brought into contact with the unit 7 of the card 5.

When the plunger 35 is returned, the spring 39 is released from a compression force to be returned, and the probe 10 is also returned to its original position. Note that the plunger 35 is provided with a plunger ring 40 and a plunger stopper 41.

Figure 7A:
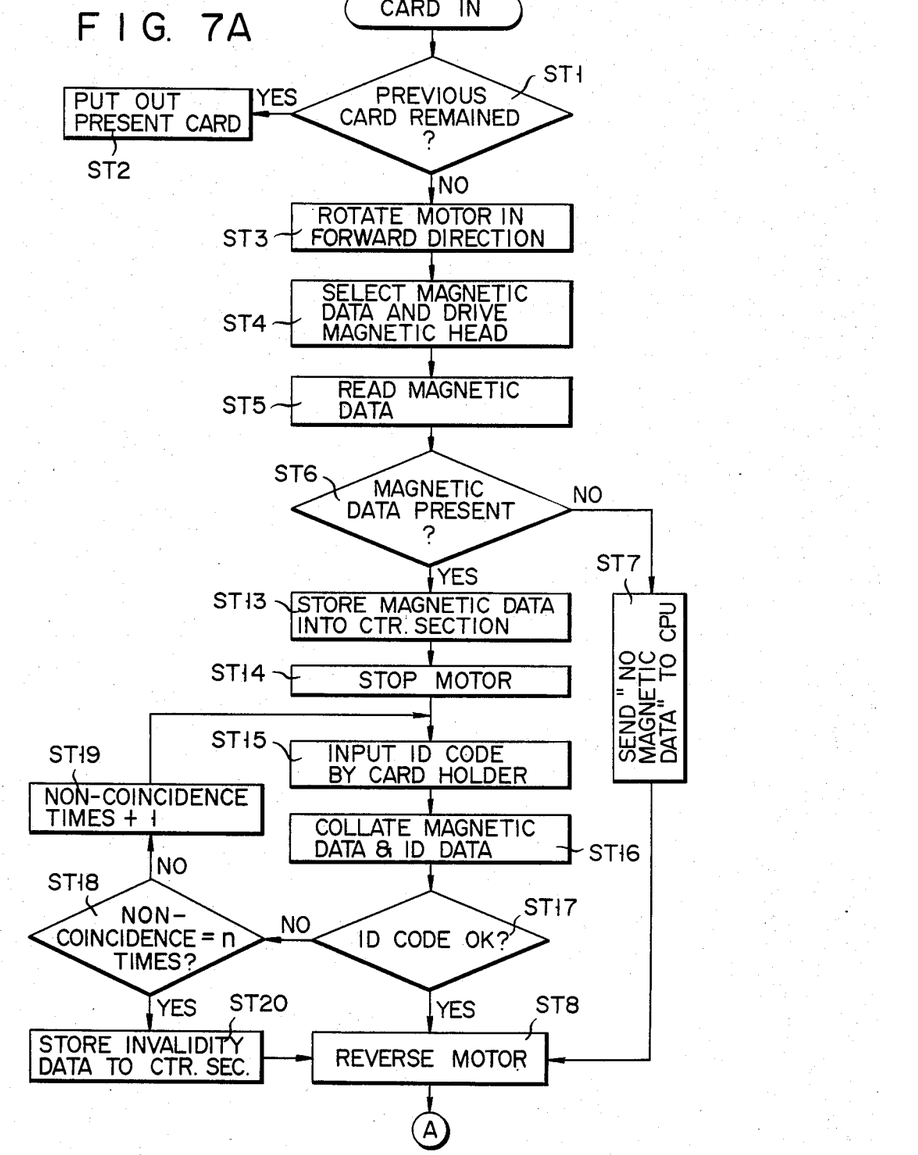
FIGS. 7A and 7B are flow charts showing a function of the circuit shown in FIG. 4.

The operation of the apparatus with the arrangement shown in FIGS. 1 to 6 will be described with reference to FIGS. 7A and 7B. A card holder inserts the card 5 in the port 4 of the terminal 1 in the direction indicated by the arrow 51. When the distal end of the card 5 reaches the sensor 8a, a card detection signal is supplied from the sensor 8a to the unit 16 through the amplifier 15a. The unit 16 checks in step ST1 of FIG. 7A signals from the sensors 8b to 8d so as to determine if no card remains on the transfer path. If YES in step ST1, the unit 16 rotates the motor 26 in the reverse direction so as to discharge the currently inserted card, in step ST2, and then displays a message indicating that identification or transaction by the other card is being performed, as needed.

If NO in step ST1, i.e., if it is determined that another card does not remain on the transfer path, the motor 26 is rotated in the normal direction, in step ST3. Upon the normal rotation of the motor 26, the shaft 26a is rotated clockwise, and the card 5 is clamped by the rollers 12a and 12b so as to be transferred to the rollers 13a and 13b. In this case, a normal rotation signal of the motor 26 is supplied from the unit 16 to the unit 23. In response to this, the unit 23 supplies a magnetic data selection instruction data to the unit 24, in step ST4.

When the distal end of the stripe 6 of the card 5 reaches the magnetic head 11, the magnetic data on the stripe 6 is read by the head 11, in step ST5. The unit 24 checks in step ST6 if the magnetic data is read by the head 11. If NO in step ST6, a signal indicating no magnetic data is supplied to the CPU 23a in step ST7. This represents that the card 5 is inserted in a wrong direction or up side down, or is an IC card having no magnetic stripe. The unit 23a supplies a motor reverse rotation instruction data to the unit 16 in step ST8, thereby transferring the card 5 toward the port 4. When the distal end of the card 5 is detected by the sensor 8a, the flow advances to step ST9, and the motor 26 is stopped. Subsequently, the solenoid 21 is driven. On the other hand, the unit 24 is switched to the IC data selection side in step ST10. When the solenoid 21 is driven, the lever 38 is pivoted clockwise through the wire 36, and the contact 9 is brought into contact with the unit 7 of the card 5. The unit 23a checks in step ST11 if IC data is obtained from the card 5. If NO in step ST11, the flow advances to step ST12. In step ST12, the solenoid 21 is deenergized so as to return the probe 10 to its original position, and thereafter, the motor 26 is rotated in the reverse direction so as to discharge the card 5 from the port 4.

On the other hand, if YES in step ST6, i.e., if it is determined that magnetic data is present, the flow advances to step ST13, and the magnetic data supplied from the unit 24 onto the bus 23b is stored in the RAM 23d. During this period, when the distal end of the card 5 reaches the position of the sensor 8d, the motor 26 is stopped in step ST14.

In this state, the card holder is requested to input identification code data as secret data through the keyboard of the unit 2 (step ST15). The input data is temporarily stored in the register 23e, and is then sent to the comparator 23f together with the data stored in the RAM 23d for comparison with each other. It is checked in step ST17 if the data coincide with each other. If NO in step ST17, non-coincidence data is supplied from the CPU 23a to the RAM 23d. The CPU 23a checks in step ST18 if the number of non-coincidences has reached n times. If NO in step ST18, the count in a predetermined memory area of the RAM 23d is incremented by one in step ST19.

If a non-coincidence is found, the flow returns to step ST15, and the unit 23a requests reinput of the identification data from the unit 2. Then, steps ST15, ST16 and ST17 are repeated. Thereafter, if NO in step ST17, and if YES in step ST18, the flow advances from step ST18 to step ST20, and the CPU 23a supplies card invalidity data to the RAM 23d, and the invalidity data is displayed on the display unit 3, as needed.

However, if YES in step ST17, the flow advances to steps ST8, ST9, ST10 and ST11 in the order mentioned. When the IC data is supplied to the unit 23 through the probe 10 in step ST11, the CPU 23a supplies a command to the CPU 5a in the card 5, and the IC data is supplied to the circuit 5d to be decrypted (step ST21). The CPU 23a requests the card holder to input identification data through the unit 2, in step ST22. The input identification data is supplied to the memory unit 5b in the card 5, and is compared with the data decrypted by the circuit 5d, in step ST23. The comparison result is checked in step ST24. If NO in step ST24, it is checked in step ST25 if the number of non-coincidences has reached n times. If NO in step ST25, the content of a non-coincidence memory is incremented by one in step ST26, and the flow returns to step ST22.

If YES in step ST25, the invalidity code data is written in the EP-ROM 5c in the card 5 (step ST27). Subsequently, in step ST28, the solenoid 21 is deenergized, and the contact 9 is separated from the contact 7. Then, the motor 26 is rotated in the reverse direction, thereby transferring the card 5 toward the port 4. In this state in step ST29, the unit 24 selects a magnetic data write mode, and it is detected that the stripe 6 is brought into contact with the head 11. As a result, in step ST30, the invalidity code data is written in the stripe 6. In step ST31, the motor 26 is rotated in the reverse direction, and the card 5 is discharged.

While, if YES in step ST24, a coincidence signal is supplied to the CPU 5a from the comparison circuit 5c in the IC card 5. The coincidence signal is then supplied to the terminal 1 through the prove 10. When the coincidence signal is received at the control circuit 23 via the IC card interface 20 and the data selection unit 24, the flow advances to step ST32 so as to check if YES has been obtained in step ST17 by the control section 23. If NO in step ST32, the flow advances to step ST28, and steps ST28 through ST31 for writing the invalidity data in the magnetic stripe 6 are executed.

If YES in step ST32, the flow advances to step ST33. The magnetic identification data stored in the RAM 23d is erased, and instead, an IC identification data representing that the result of the collation of IC data and ID code was OK is stored therein. Then, the flow advances to step ST34, and the CPU 23a causes the unit 3 to display a completion of the identification operation. Thereafter, the flow advances to step ST12, and the solenoid 21 is deenergized. Then, the motor 26 is rotated in the reverse direction and the card 5 is discharged.

In this manner, when a coincidence between the IC and ID data is detected, the card 5 presented by the holder is confirmed a legal and valid card, and the transaction between the store in which the terminal 1 is provided and the card holder is allowed.

Note that when the identification result of IC data is OK in step ST32, the magnetic data is omitted, and the ID data as the identification result of the IC data is selected, irrespective of the result of the identification of the magnetic identification data.

This means that when both of the magnetic data and the IC data are formed OK, a priority is given to the coincidence of IC data and the card is used based on the IC data, thus enabling the card holder to easily discriminate the using state of his card.

Figure 7B:
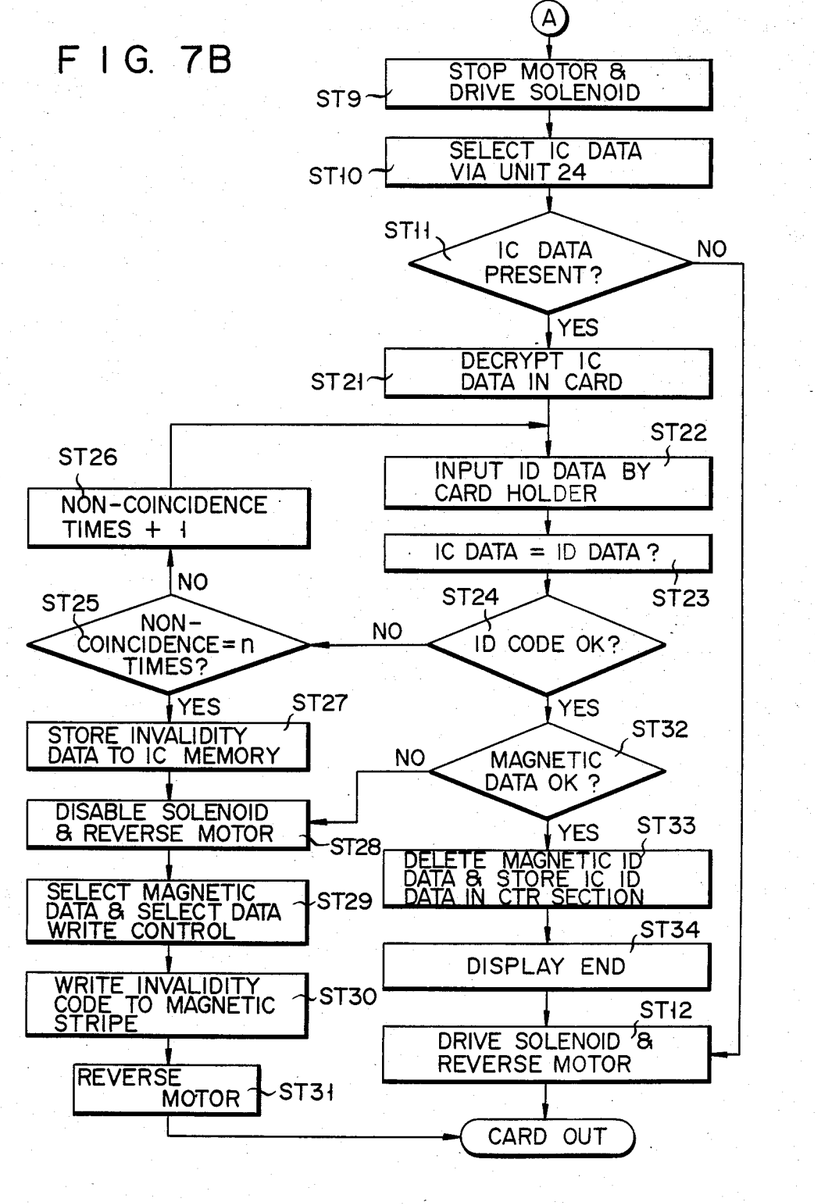
Figure 8:
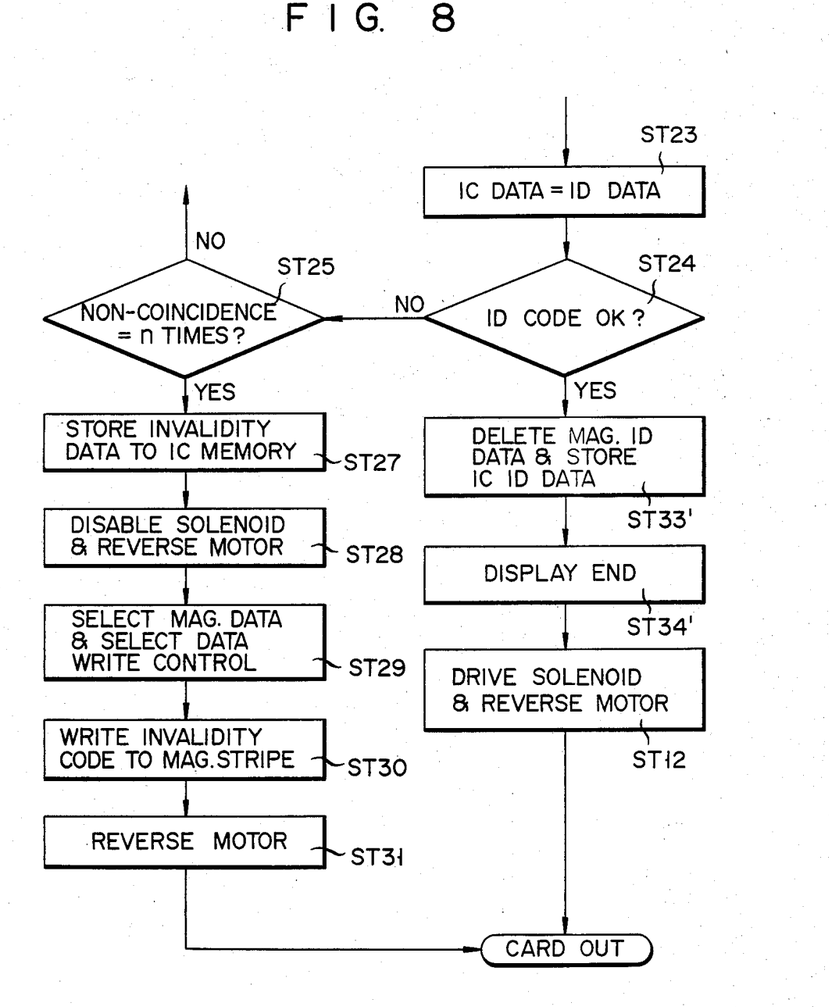
FIG. 8 is a flow chart showing another function of the circuit of FIG. 4.

FIG. 8 is a flow chart showing different function of the terminal. The flow chart of FIG. 8 shows the operation similar to those of FIGS. 7A and 7B. The different point is that the operation of the step ST32 is deleted and after the step ST24 steps 33', 34' are immediately executed. Therefore, when the ID code is identified as being OK at the step ST24, irrespective of whether the identification result of the magnetic data is "OK" or "BAD", display showing the identification result of being OK is made. The merit of the operation shown in the flow chart of FIG. 8 is that there is no load on the card holder when he desires his card only as an IC card. Since, the magnetic data is easy to be read out of the card, the card holder should determine his magnetic identification code data and IC identification code data being different with each other. Memorizing different two secret codes is, however, very troublesome for the card holder. Thus, the card holder may use his card as a valid one if the identification result of the IC data is OK, irrespective of the identification result of the magnetic data. This is very effective for maintaining secrecy of the card and for decreasing the load of the card holder. The terminal having the function of FIG. 8 may operate as a magnetic card identification terminal having no IC memory, by jumping the operation from ST11 to ST12.

In steps ST24 through ST30 of FIG. 7B, if a noncoincidence between the IC and ID data is detected, the invalidity code data is written both in the IC memory and in the magnetic stripe irrespective of the identification result between the magnetic data and the input data. However, when the magnetic data is valid and the IC data is invalid, the invalidity data is written in the IC memory in step ST27, and thereafter, the flow can jump to step ST31 so as to exhaust the card.

The above description has been made for a case wherein the card 5 incorporates the stripe 6 and the IC memory. When the card 5 has only the magnetic stripe 6, since the card is exhausted through steps ST8 to ST12 if YES in step ST17, the terminal 1 can be used for the magnetic card. When the card 5 is an IC card, since the card is exhausted via steps ST32, ST33 and ST12 if YES in step ST24, the terminal 1 can be used for the IC card.

In the above embodiment, the card having the magnetic stripe and the IC memory has been explained. However, bar codes can be printed as a data holding means on a card surface instead of the magnetic stripe, and can be read by a bar code reader. Alternatively, an embossed portion can be formed on a surface of a plastic card, and a terminal can be provided with an emboss inprinter and an image reading means comprising a CCD. The data reading means is not limited to the combination of the unit 7 and the contact 9. For example, the data can be read by an optical reader comprising light emitting and light receiving elements.

The IC code is identified by using a CPU incorporated in the card. However, the IC code stored in the card can be identified at the side of the terminal.

What is claimed is:

1. A card identification system comprising:
   an identification card having first and second data-storing means comprised of different types of memory media for storing, respectively, at least one of first and second identification data;
   an identification terminal having first data access means for accessing said first data-storing means, and second data access means for accessing said second data-storing means, at least one of said first and second data access means including: (a) data transducer means; (b) determining means for detecting the presence or absence of said first and second identification data; and (c) data selection means for deactivating an access operation to said first data-storing means by said first data access means and activating an access operation to said second data-storing means by said second data access means upon said determining means detecting absence of data in the first data-storing means;
   input means for inputting identification information; and
   identification means for identifying at least one of said first and second identification data with said identification information.

2. The system according to claim 1, wherein said first identification data is stored in a magnetic medium, and said first data access means includes a transducer that converts a magnetic signal to an electric signal.

3. The system according to claim 2, wherein said second identification data is stored in a semiconductor memory, and said second data access means includes probe means for engaging electrodes of said semiconductor memory.

4. The system according to claim 3, wherein said identification means includes a first identification circuit provided in said identification terminal, and a second identification circuit provided in said identification card.

5. The system according to claim 4, wherein said identification terminal further includes reading means for reading one of said first and second identification data when said determining means detects the presence of data, and a first detecting means for detecting the end of the reading.

6. The system according to claim 5, wherein said data selection means changes an access operation on the basis of the detection by said first detecting means.

7. The system according to claim 5, further comprising means for clearing results of a comparison between said first identification data and said identification information and storing only results of a comparison between said second identification data and said identification information.

8. The system according to claim 1, wherein said identification terminal includes a second detecting means for detecting whether said identification card is inserted into said identification terminal.

9. The system according to claim 8, wherein said data selection means changes the access operation upon detection of the identification card by said second detecting means.

10. The system according to claim 1, wherein said first data access means includes a first transfer means for transferring at least one of said data transducer means and said information card for reading the first identification data.

11. The system according to claim 10, wherein said second data access means includes a second transfer means for transferring at least one of said information card and said second data access means for accessing said second data-storing means.

12. The system according to claim 11, wherein said first data access means reads the first identification data as said identification card is being moved by said first transfer mechanism, and said second data access means reads the second identification data as said identification card is stopped after being completely transferred by said second transfer mechanism.

13. The system according to claim 1, wherein said identification terminal includes means for writing invalidity data in a memory when at least one of said identification data is invalid.

14. A card identification system comprising:
    an information card having first and second data-storing means comprised of different types of memory media for storing, respectively, at least one of first and second identification data;
    a card terminal having first data access means for accessing said first data-storing means, and second data access means for accessing said second data-storing means, at least one of said first and second data access means including (a) data transducer; (b) first transfer means for transferring at least one of said first data access means and said information card so as to access said first data-storing means; and (c) second transfer means for transferring at least one of said second data access means and said information card so as to access said second data-storing means; (d) first drive control means for driving said first transfer means upon detection of said information card being inserted into said terminal; and (e) second drive control means for driving said second transfer means after said first drive control means finishes the drive of said first transfer means;
    input means for inputting reference information; and
    identification means for identifying said first data with said reference information and for identifying said second data with said reference information.

15. The system according to claim 14, wherein said first transfer means transfers said information card toward said first data access means.

16. The system according to claim 15, wherein said first transfer means includes a first detector means for detecting said information card being inserted into said terminal.

17. The system according to claim 16, wherein said first transfer means includes a second detector means for detecting that said information card reaches a position that indicates that the access to said first data-storing means by said first data access means is completed.

18. The system according to claim 15, wherein said second transfer means transfers said second access means substantially perpendicularly to a direction in which said information card is transferred by said first transfer means so as to permit said second data access means to access said information card.

19. The system according to claim 18, wherein said first transfer means includes a third detector means for detecting that said information card reaches a position where said first data-storing means is accessible to said second data access means.

20. The sysatem according to claim 18, wherein said second transfer means includes a solenoid, a plunger and connecting means for connecting said second data access means and said solenoid.

21. A card identification method comprising the steps of:
  inserting an identification card into an identification terminal, said identification card having at least one of first and second identification data which are stored in first and second data-storing means, respectively;
  accessing said first data-storing means by using a first data access means, and if data is found in said first data-storing means, entering identification information from said identification terminal and comparing the identification information with said first identification data to determine whether said identification information coincides with said first identification data, and if no data is found in said first data-storing means, considering said identification card to be in a non-data condition;
  transferring at least one of said identification card and second data access means to a position where said second data-storing means is accessible to said second data access means;
  accessing said second data-storing means by using a second data access means, and if data is found in said data-storing means, entering identification information from said identification terminal, comparing the identification information with said second identification data to determine whether said identification information coincides with said second identification data, and if no data is found in said second data-storing means, finding said identification card to be in a non-data condition; and
  releasing said identification card from said identification terminal on the basis of the coincidence detection or the finding of non-data condition.

22. The method according to claim 21, wherein if said identification information is detected as not coinciding with said first identification data, storing data representing the non-coincidence in said first data-storing means.

23. The method according to claim 21, wherein both said identification card and said second data access means are transferred in said transferring step.

24. The method according to claim 21, wherein, if said identification information is detected as not coinciding with said second identification data in said second identifying step, storing data representing the non-coincidence in said second data-storing means.

25. The method according to claim 21, further comprising the step of clearing results of a comparison between said first identification data and said identification information step if said identification information coincides with said second identification data.

* * * * *